US008944343B2

(12) United States Patent
Cesak et al.

(10) Patent No.: US 8,944,343 B2
(45) Date of Patent: Feb. 3, 2015

(54) SPRAYING SYSTEM WITH FLOW SENSING AND MONITORING DEVICE

(71) Applicant: Spraying Systems Co., Wheaton, IL (US)

(72) Inventors: James Cesak, Westchester, IL (US); Joshuah DeVoll, Streamwood, IL (US)

(73) Assignee: Spraying Systems Co., Wheaton, IL (US)

( * ) Notice: Subject to any disclaimer, the term of this patent is extended or adjusted under 35 U.S.C. 154(b) by 159 days.

(21) Appl. No.: 13/677,901

(22) Filed: Nov. 15, 2012

(65) Prior Publication Data

US 2013/0119150 A1 May 16, 2013

Related U.S. Application Data

(60) Provisional application No. 61/560,532, filed on Nov. 16, 2011.

(51) Int. Cl.
*B67D 7/08* (2010.01)
*B05B 12/00* (2006.01)
*B05B 13/02* (2006.01)
*F16K 37/00* (2006.01)

(52) U.S. Cl.
CPC ............ *B05B 12/004* (2013.01); *B05B 13/0257* (2013.01); *F16K 37/0058* (2013.01); *F16K 37/0025* (2013.01)
USPC ................... 239/71; 239/66; 239/69; 239/73; 239/99; 239/101; 73/861.53

(58) Field of Classification Search
USPC .............. 239/66, 67, 69, 71, 73, 74, 99, 101; 73/269, 861, 861.357, 861.53, 861.05
See application file for complete search history.

(56) References Cited

U.S. PATENT DOCUMENTS

| | | | |
|---|---|---|---|
| 5,209,114 A | 5/1993 | Lalin et al. | |
| 5,979,247 A | 11/1999 | Kizawa | |
| 6,176,438 B1 | 1/2001 | Sato et al. | |
| 6,679,436 B1 * | 1/2004 | Onishi et al. | 239/101 |
| 6,705,553 B2 * | 3/2004 | Drechsel | 239/74 |
| 7,086,613 B2 | 8/2006 | Hennessy | |
| 7,182,271 B2 | 2/2007 | Cesak | |
| 2007/0160769 A1 | 7/2007 | Maev et al. | |

OTHER PUBLICATIONS

United States Patent and Trademark Office, International Search Report in the International Patent Application No. PCT/US2012/065244 (Jan. 11, 2013).
United States Patent and Trademark Office, Written Opinion of the International Searching Authority in the International Patent Application No. PCT/US2012/065244 (Jan. 11, 2013).

* cited by examiner

*Primary Examiner* — Steven J Ganey
(74) *Attorney, Agent, or Firm* — Leydig, Voit & Mayer, Ltd.

(57) ABSTRACT

A liquid flow monitoring device for monitoring the supply of liquid to a spray nozzle including a deflectable check valve in a liquid supply passage to the spray nozzle, a light sensing device having a light emitter and a light receiver disposed on opposite sides of the check valve, the check valve being deflectable into at least partially obstructing relation to a light beam directed from the light emitter to the light receiver as an incident to liquid flow through the monitoring device to the spray nozzle, and a control system for receiving signals from the sensing device.

14 Claims, 11 Drawing Sheets

SPRAYING SYSTEM WITH FLOW SENSING AND MONITORING DEVICE

CROSS-REFERENCE TO RELATED APPLICATIONS

This patent application claims the benefit of U.S. Provisional Patent Application No. 61/560,532, filed Nov. 16, 2011, which is incorporated by reference.

FIELD OF THE INVENTION

The present invention relates generally to spraying systems for spraying fluids, and more particularly, to an apparatus and method for detecting and monitoring the liquid flow from a spray device.

BACKGROUND OF THE INVENTION

Spray devices, such as spray guns, for spraying liquids are commonly used in various industrial applications. To ensure proper operation of the spray device, it is often necessary to monitor the flow generated by the spray device. Presently, there are applications that require rapid detection of the liquid flow generated by a spray device, and in many systems the spray device is required to guarantee that the liquid is actually sprayed when demanded by the system.

In meat and other food processing applications, for example, spray devices are used to surface spray antimicrobials to the product to lower bacterial load or growth. In such spray processes, a specific amount of antimicrobial liquid must be applied based upon the weight of the product and regulatory limits imposed by governmental bodies. This volume typically is dispensed either in a single shot manner or in multiple shots over a specified period of time. If the liquid is not sprayed on the product as programmed, significant product loss or defects can occur. Moreover, many such applications use spray devices that are operated at very high speeds, i.e., they are turned on and off rapidly. The ability to accurately detect the flow in such high speed operation is needed to ensure proper application.

One method of detecting the flow from such spray devices has been the use of light transmitting and receiving sensors, as disclosed in U.S. Pat. No. 7,182,271, assigned to same assignee as the present application, the disclosure of which is incorporated herein by reference. In such sensors, light from a transmitter portion of the sensor is reflected off the spray pattern and provides a signal output from the sensor which can be transmitted to a controller to provide alarming or other calculations using the signal. Such sensors are effective in applications where the environment is "clean", whereby the sensor is not exposed to falling debris from the application or a dusty or otherwise contaminated environment. The sensors, however, cannot be reliably used in applications in which debris or contaminants can fall onto or otherwise come in contact with the transmitter or receiving portions of the sensor to cause malfunctions.

Other methods of detecting sprayed liquids have undesirably necessitated the insertion of devices into the liquid flow stream, have required complicated calculations based upon the particular liquid, and have not been susceptible to high speed response, such as is necessary for monitoring the flow of spray devices that are operated at rapid on/off cycling in many food processing applications.

OBJECTS AND SUMMARY OF THE INVENTION

It is an object of the present invention to provide an apparatus and method effective for detecting and monitoring flow from a spray device that is not effected by contaminants or debris generated in the environment into which the liquid is directed.

Another object is to provide an apparatus and method as characterized above which is capable of detecting the flow from a spray device in high speed cyclic spraying operations with response times as rapid as +/−1 millisecond.

A further object is to provide an apparatus and method of the foregoing type in which flow detection and monitoring is effected without insertion into or interference with the liquid flow discharge.

Still a further object is to provide such a flow detection apparatus and method that is effective for both verifying flow from the spray device, as well as the magnitude of the flow.

Yet a further object is to provide a flow detection and monitoring method and apparatus of the above kind that is relatively simple in operation and economical in manufacture.

Other objects and advantages of the invention will become apparent upon reading the following detailed description and upon reference to the drawings, in which:

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

Figure 1:
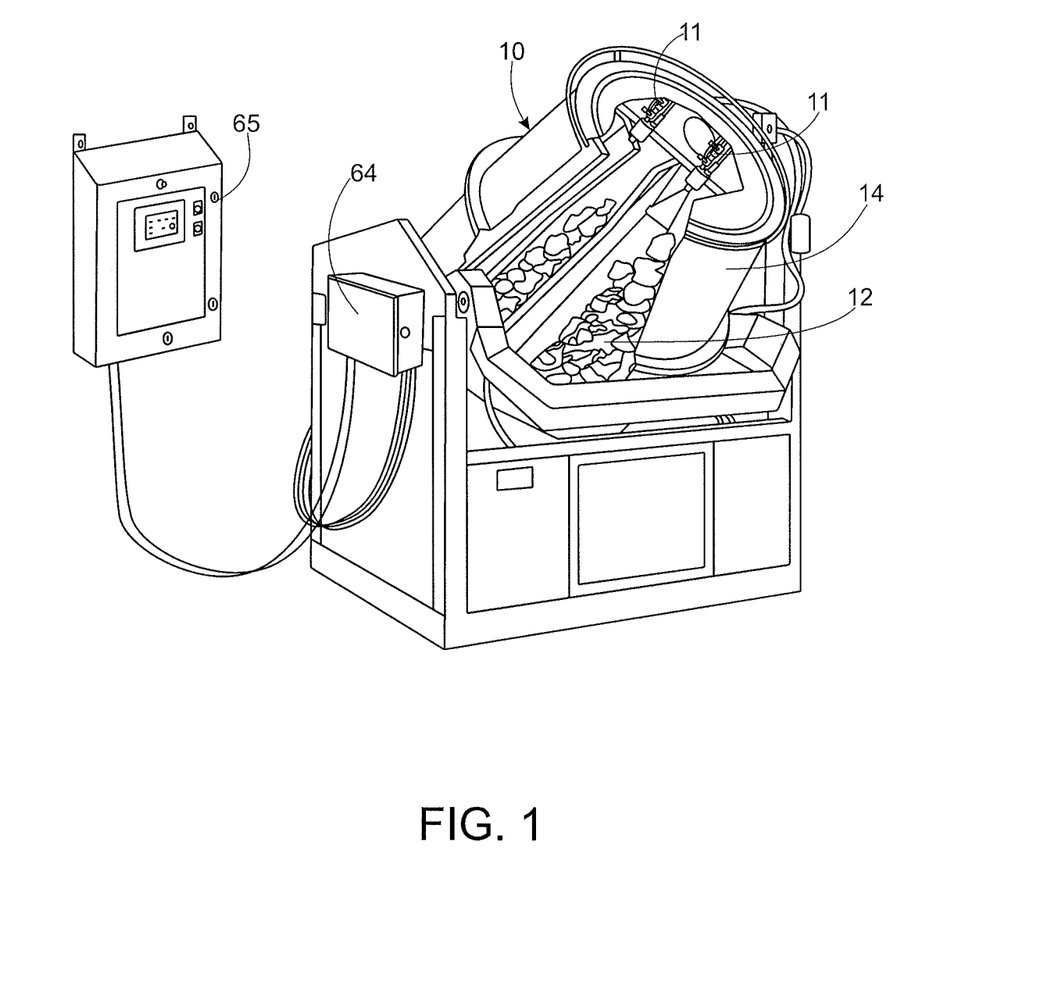
FIG. 1 is a perspective of an illustrated meat grinder having a liquid antimicrobial solution sensing and monitoring device in accordance with the present invention.
Figure 2:
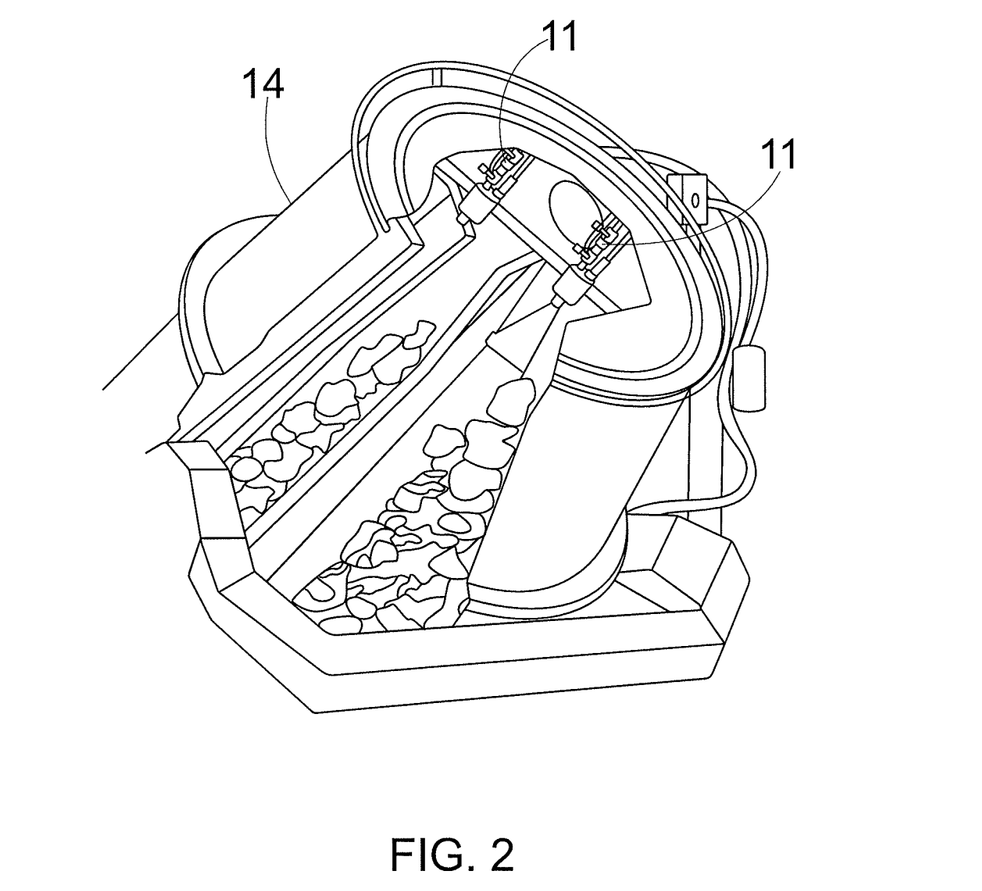
FIG. 2 is an enlarge fragmentary perspective of the meat grinder shown in FIG. 1.
Figure 3:
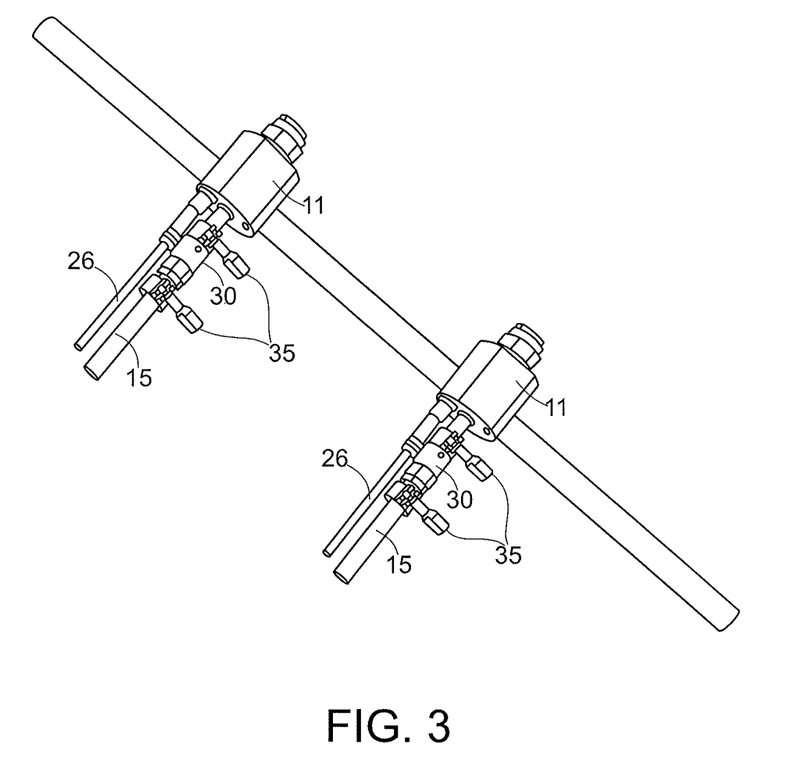
FIG. 3 is an enlarged perspective of a pair of the liquid spray devices of the illustrated meat grinder.

Referring now more particularly to the FIGS. 1-3 of the drawings, there is shown an illustrative food processing system, in this case a meat grinder 10, having a pair of spray devices 11 for directing an antimicrobial solution onto a meat product 12 during grinding. The meat grinder 10, which may be of a conventional type, includes a drum 14 tilted at an acute angle to the vertical with the spray devices 11 mounted adjacent an upper end for directing antimicrobial solution downwardly onto the meat product 12 during processing. Since the spray devices 11 are identical in construction and operation, only one need be described herein in detail.

Figure 4:
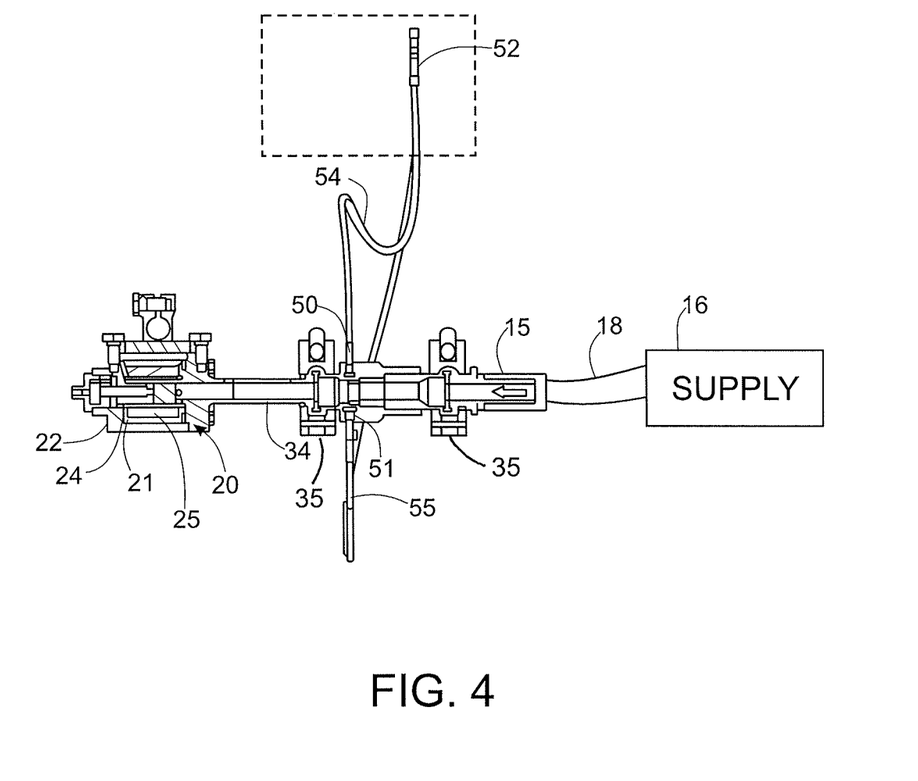
FIG. 4 is a longitudinal section of one of the illustrated spray devices having a liquid flow detection and monitoring device in accordance with the invention.

Each spray device 11, as depicted in FIG. 4, includes an upstream tubular liquid inlet 15 coupled to a fluid supply 16 of antimicrobial solution through a liquid supply line 18 and a downstream electrically actuated high-speed spray nozzle assembly 20. The high speed electrically actuated spray nozzle assembly 20 may be of a commercially known type, such as offered by Spraying Systems Co., assignee of the present application, under the trademark PulsaJet, various components of which and their mode of operation are similar to those described in U.S. Pat. No. 7,086,613, also assigned to the same assignee as the present application, the disclosure of which is incorporated herein by reference.

The illustrated spray nozzle assembly 20 includes a nozzle body 21 having a spray tip 22 fixed at a downstream end thereof and a valve needle having a an upstream metallic plunger 24 disposed within a solenoid coil 25 appropriately coupled to an outside electrical source by electrical leads in this case contained within a suitable conduit 26 (FIG. 3) that extends from the drum 14. As in known in the art, electrical actuation of the solenoid coil 25 is effective for moving the valve plunger 24 and needle to a spray tip opening position against the biasing force of a closure spring. Such electrically actuated spray nozzle assemblies 20 may be operated at high speeds, up to 250 hertz for intermittent discharge of the liquid spray.

Figure 6:
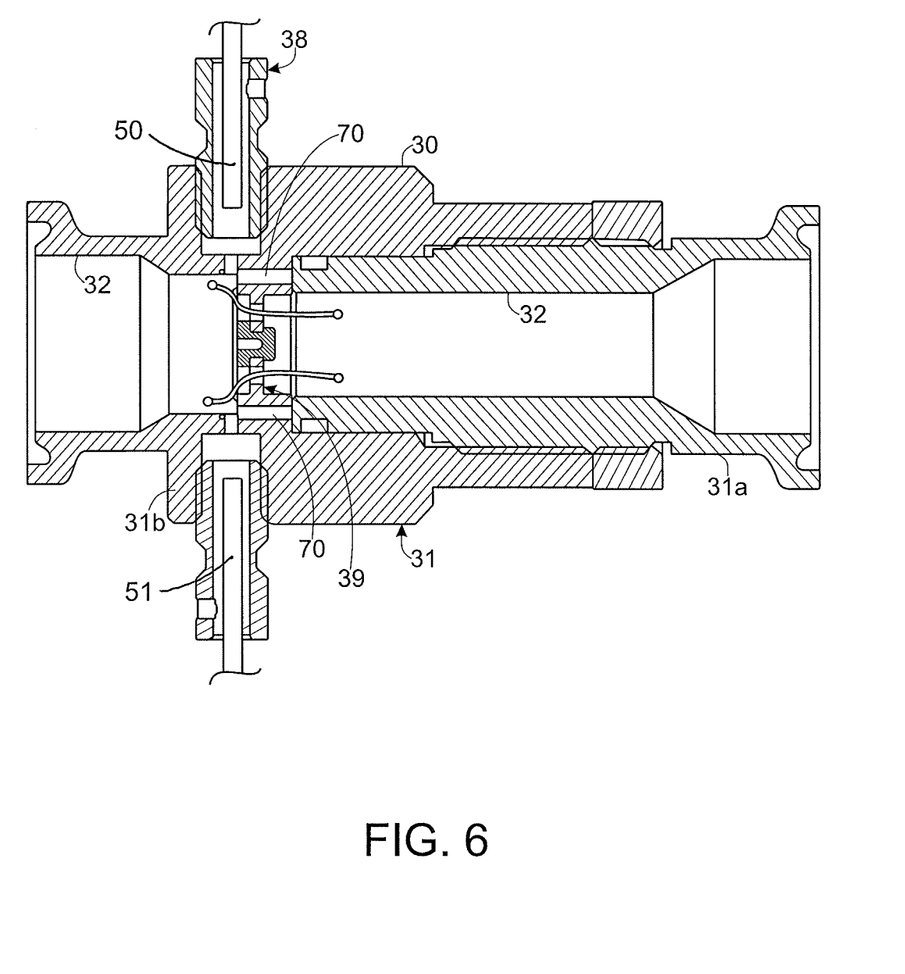
FIG. 6 is an enlarged section of the liquid flow detection and monitoring device.

In accordance with the invention, the spray device has a high speed flow detection and monitoring device enclosed and separated from the product being processed so as to be operable in contaminated processing applications. In the illustrated embodiment, a flow detection and monitoring device 30 is provided immediately upstream of the spray nozzle assembly 20, in this case interposed between the tubular liquid inlet 15 and the spray nozzle assembly 20. The flow detection and monitoring device 30, as best depicted in FIG. 6, includes a tubular body 31 comprising an inlet body portion 31a threadably engaged within an outlet body portion 31b for defining a liquid flow sensing passage 32 communicating between the liquid inlet 15 and the spray nozzle assembly 20. The inlet body portion 31a in this case is removably coupled to the tubular inlet 15 by an annular sanitary clamp 35 (FIG. 4) of a known type and the outlet body portion 31b is fixed to a tubular upstream extension 34 of the spray nozzle assembly 20 by a similar releasable sanitary clamp 35.

In carrying out the illustrated embodiment, the flow detection and monitoring device 30 includes a light sensing device 38 that is operable in conjunction with a check valve 39 disposed within the liquid flow sensing passage 22. (FIGS. 6 and 7) The check valve 39 in this instance comprises an annular orifice plate 40 defined by an integral central plate portion of the outer body disposed within the passage 32. The illustrated orifice plate 40 has a plurality of circumferentially spaced liquid flow passages 41 through the orifice plate 40 and a flexible valve diaphragm 42 fixedly secured on a downstream side of the orifice plate 40. The diaphragm 42 preferably has a light weight construction that does not significantly inhibit liquid flow or pressure to the nozzle assembly. To that end, the illustrated diaphragm 42 has an umbrella configured construction having an enlarged central stem 44 fixed within a central aperture of the orifice plate 40 and a flexible peripheral portion 45 that seats on an outer downstream annular rim of the orifice plate 40 when in a closed position.

Upon the direction of pressurized liquid into the flow sensing passage 32 from the inlet 15, the peripheral diaphragm portion 45 will deflect in a downstream direction permitting the flow of liquid through the check valve passages 41 and about the periphery of the diaphragm 42 through passage 32 into and from the spray nozzle assembly 20. It will be understood that while in the illustrated embodiment the orifice plate 40 is defined by an integral wall of the outer body member 31b, alternatively, the orifice plate 40 may be in the form of a separate plate fixedly secured within the liquid flow sensing passage 32.

Figure 5:
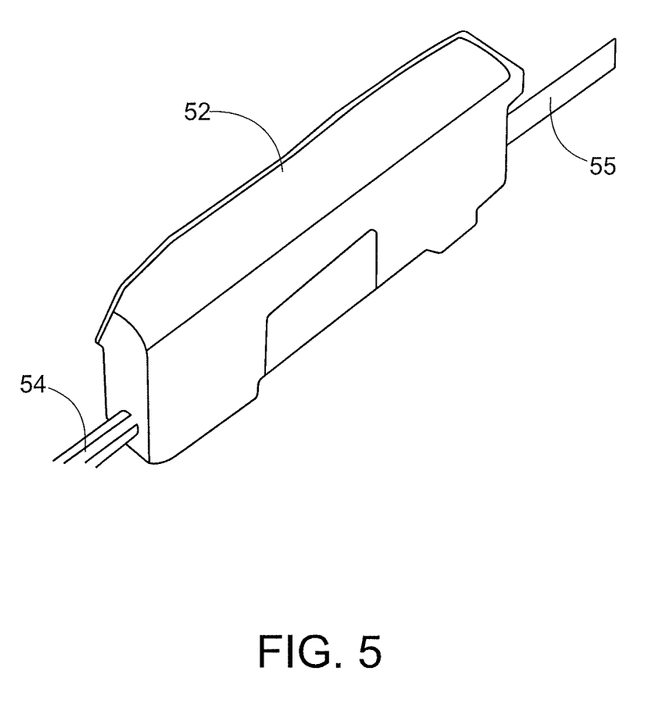
FIG. 5 is a perspective of the optical sensor of the illustrated liquid flow detection and monitoring device.

In carrying out this embodiment, the sensing device 38 includes a light emitter 50 and a light receiver 51, each mounted in enclosed fashion within the outer body 31b on opposite sides of the flow sensing passageway 32 immediately adjacent a downstream side of the check valve 39 and coupled to an optical sensor 52 (FIGS. 4 and 5) by respective fiber optic lines 54, 55. The light emitter 50, light receiver 51, and optical sensor 52 may be of commercially available types, with the sensor preferably being a commercially available Kyence Model FSN-N series sensor. The emitter 50 is operable for emitting a detectable fiber optic transmitted light beam through liquid directed through the sensing flow passage 32 to the spray nozzle assembly 20, the light receiver 51 is capable of accepting and/or measuring the intensity of transmitted light received, and the optical sensor 52 is operable for generating a digital output signal based upon the detection transmitted through the liquid light by the receiver 51. The light emitter 50 and light receiver 51 each are protectively contained within a respective photo eye holder 58,59 having a PET lens 60 and seal or gasket 61 disposed within the outer body 31b. For convenient access, it will be appreciated that the optical sensor 52 can be mounted within an appropriate junction box 64 and which in turn can be electrically connected to a control panel 65 (FIG. 1) for receiving the monitoring flow/no flow condition from the optical sensor 52. It will be appreciated by one skilled in the art that the liquid being directed to the spray nozzle assembly 20 preferably is clear or translucent through which light is transmittable. Where the translucency of the fluid makes it more difficult to transmit light through it, as will be appreciated by one skilled in the art, appropriate amplification of the signals may be desired.

Figure 7:
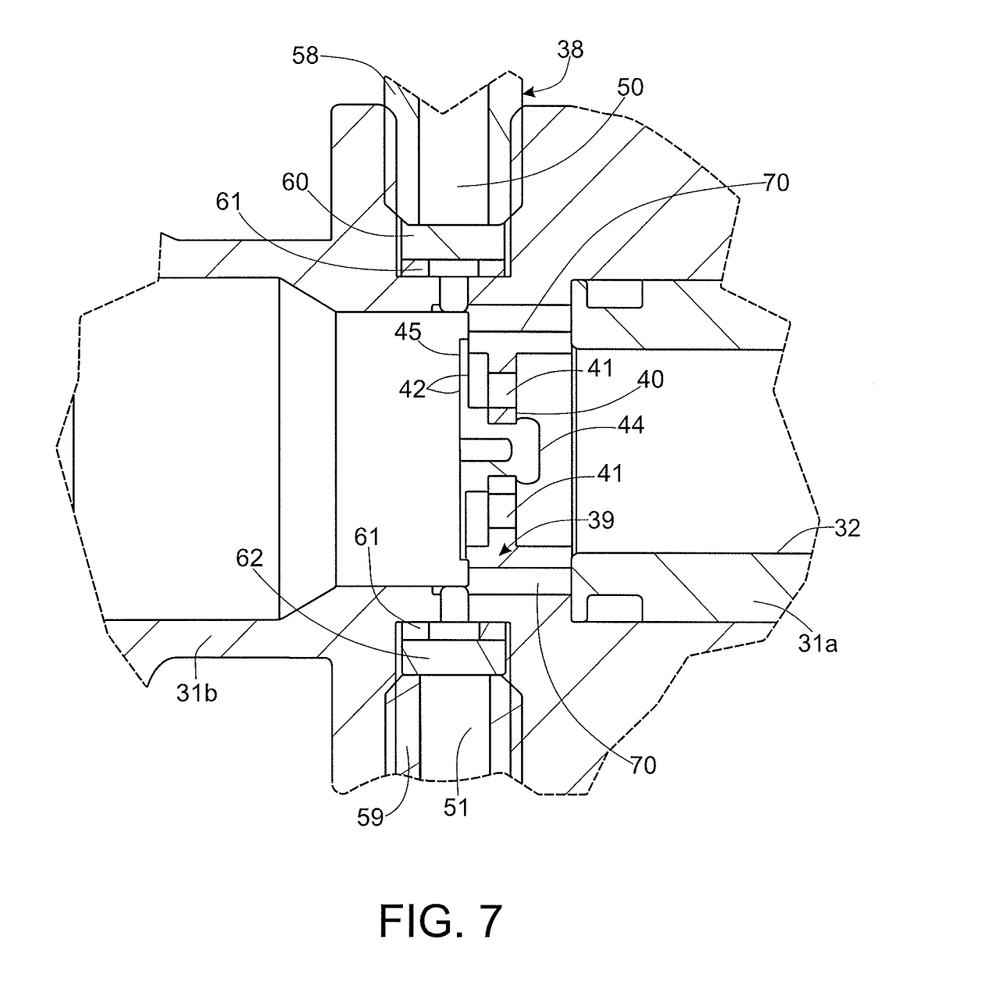
FIGS. 7-7c are enlarged fragmentary sections of the illustrated flow detection and monitoring device at successive stages of liquid passage through the device.
Figure 7A:
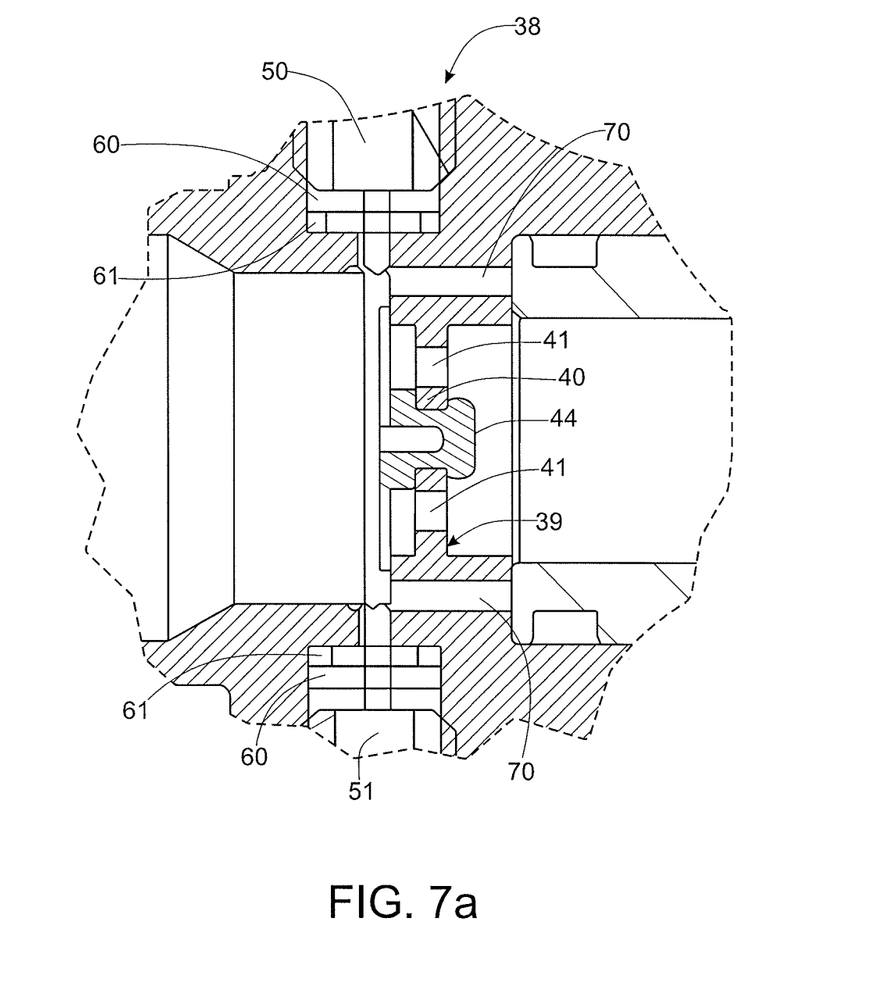
Figure 7B:
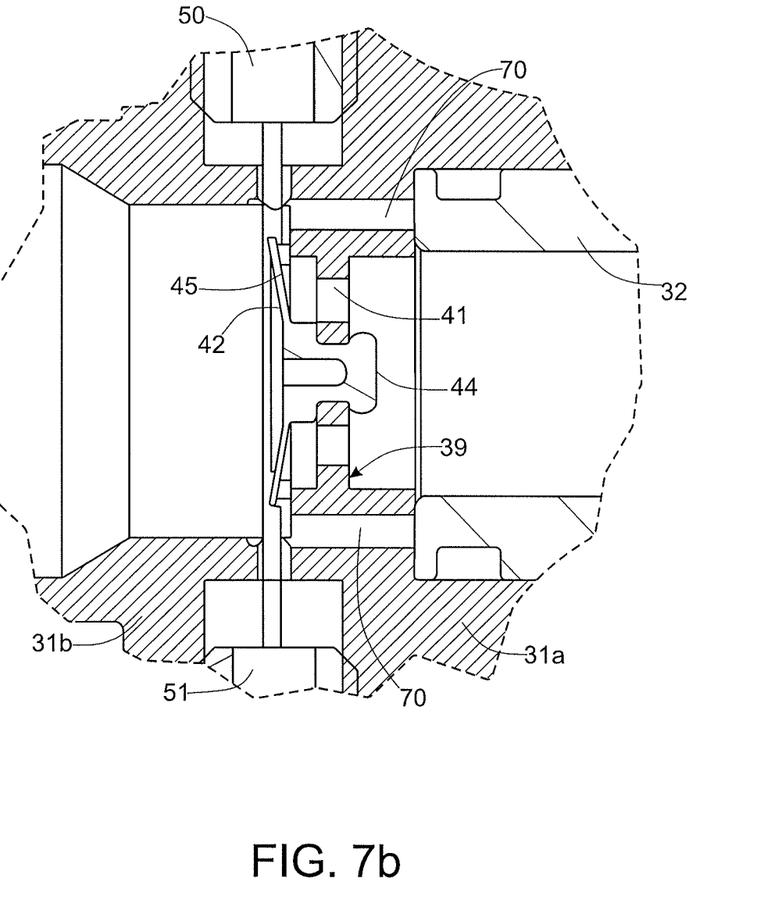
Figure 7C:
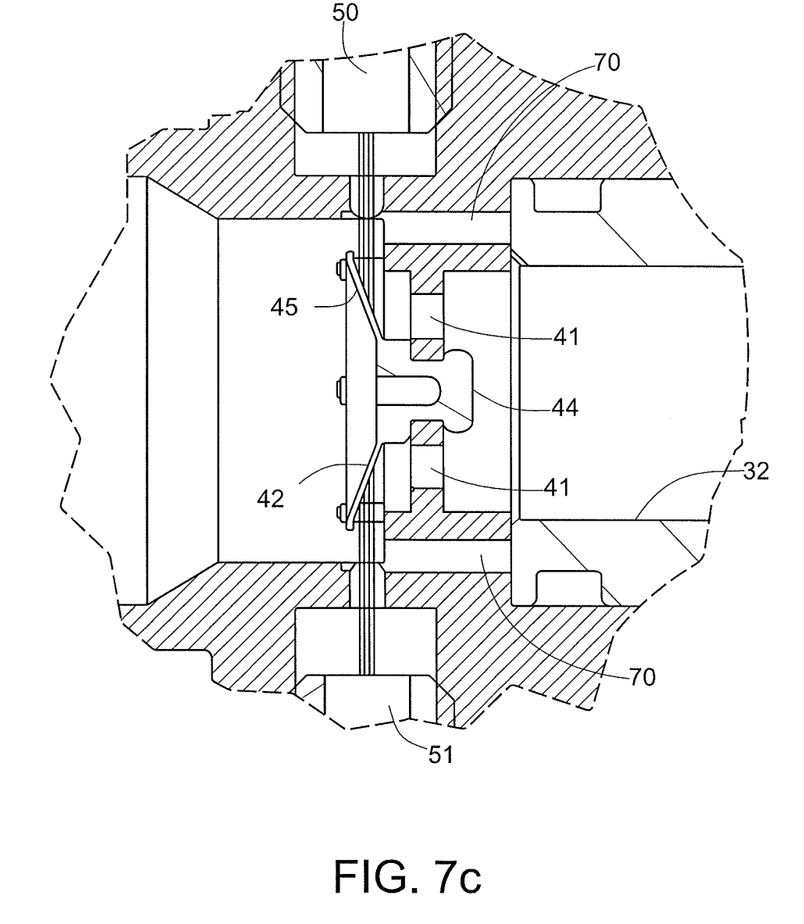

In operation, the liquid flow detection and monitoring device 38 is operable as a flow switch for verifying a flow or no flow condition through the flow sensing passage 32. When the diaphragm 42 of the check valve 39 is in the retracted or closed position, as depicted in FIG. 7, no flow is present through the nozzle body 31. This is verified by the optical sensor 52 with the light beam being transmitted in unobstructed fashion between the emitter 50 and receiver 51. As a differential pressure is created about the check valve 39, the outer peripheral portion of the diaphragm 42 will separate from the orifice plate 40 creating a gap of some distance for fluid to flow through the orifice plate passages 41 and about the outer periphery of the diaphragm 42 and to the nozzle body assembly 20. As can be seen in FIG. 7a, the light transmission of the emitter 50 is interrupted by the distance that the diaphragm is moved away from the orifice plate 40 in a downstream direction. The light, however, is not completely blocked. As flow continues to increase to the spray nozzle assembly 20, the diaphragm 42 is forced further downstream, completely interrupting the light beam (FIG. 7c), the lack of intensity of which is sensed by the optical sensor 52 which in response thereto provides a digital signal output to the control 65, which can be designed to appropriately monitor the cyclic flow and spray discharge.

In keeping with this embodiment of the invention, the flow detection and monitoring device 38 is operable of not only verifying flow/no flow conditions, but also acceptable flow rates. To this end, the optical sensor 52 is operable for detecting a particular amount of flow to the spray nozzle assembly, at levels less than the amount required to completely deflect the diaphragm to the completely light blocking position of FIG. 7c. Preferably, the optical sensor 52 has an adjustable switch or set point based upon a particular intensity of light received by the receiver 51 for triggering the output signal to the control 65. According to this embodiment, if it is determined, for example, that a 0.5 gpm flow rate through the flow sensing passage 32 will deflect the diaphragm 42 to a point to reduce the light transmitted to the receiver by 50%, the optical sensor 52 may be adjustably set to generate the output signal when the light is blocked by that percentage, which in that case would be the effective switching point. The signal would then verify when that flow rate has been achieved. It will be understood that the optical sensor 52 could be set for detecting different percentages of light blockage to the emitter, depending upon different flow rates for which monitoring is desired. Hence, setting the switch point at a predetermined percentage of deflection not only verifies that flow is present, but that a minimum acceptable flow rate has occurred. In practice, it has been found that response times of +/- a millisecond are achievable at cyclic shots of fluid to the spray nozzle as short as a millisecond.

Figure 8:
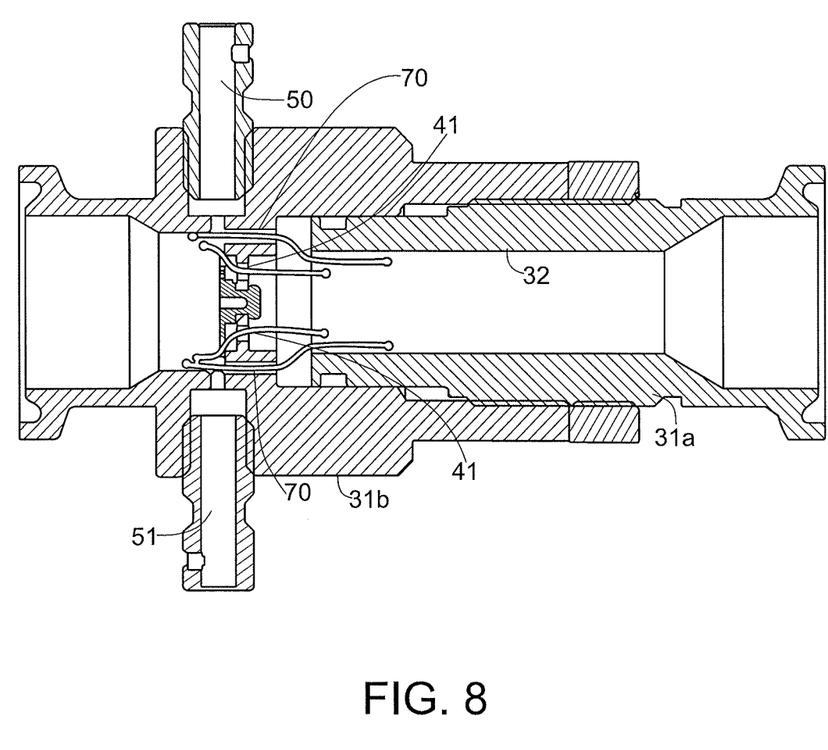
FIG. 8 is a longitudinal section of the illustrated liquid flow detection and monitoring device with an inner body portion moved for enabling greater liquid flow through the device during its operation.

In carrying out another embodiment useful for detecting flow rates greater than that directly related to deflection of the diaphragm 42, the inner body portion 31a can be selectively adjusted upstream of the outer body portion 31, as depicted in FIG. 8, for permitting additional flow through the check valve 38 about a plurality of auxiliary passageways 70 in outwardly disposed radially relation to the check valve passages 41. These auxiliary passages 70, which are otherwise closed by the downstream end of the inner body portion 31a, come into communication with the liquid flow passage 32 when the inner body portion 31a is axially retracted from the outer portion 31b as shown in FIG. 8. Hence, the deflection of the diaphragm 42 to a light blocking position sensed by the optical sensor 52 for generating an output signal from the optical sensor 52 again would not only verify the existence of flow through the flow passageway, but a greater magnitude of flow as indicated by the combined flow through the check valve passages 4 and auxiliary passages 70. The optical sensor 52 again could calibrate the particular flow rate depending upon diaphragm deflection, but at greater flow rate levels.

From the foregoing, it can be seen that an apparatus and method is provided for detecting and monitoring the flow to a spray device that is not effected by contaminants or debris generated in the environment into which the liquid is directed. The flow detecting and monitoring device is operable at high cyclic speeds of operation and is effective for both verifying the flow of liquid to the spray device, as well as the magnitude of the flow rate. Yet, the flow detection and monitoring device is relatively simple in operation and economical in manufacture.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

A preferred embodiment of this invention is described herein, including the best mode known to the inventor for carrying out the invention. Variations of this preferred embodiment may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A spraying system comprising:
   a spray device for generating and directing a liquid spray;
   a liquid supply passage for directing liquid to the spray device;
   a liquid flow monitoring device for monitoring liquid flow through said spray device;
   said liquid supply passage defining a monitoring orifice through which at least a portion of the liquid supplied to said spray device passes;
   a membrane for closing said monitoring orifice when liquid is not passing through said liquid supply passage to said spray device and being deflectable away from said monitoring orifice as an incident to liquid flow through said liquid supply passage and monitoring orifice to said spray device;
   a sensing device for sensing the deflection of said membrane away from said monitoring orifice as an incident to liquid flow through said liquid supply passage and monitoring orifice to said spray device, said sensing device including a light emitter on one side of said monitoring orifice for emitting a light beam and a light receiver on an opposite side of said monitoring orifice for receiving a light beam emitted by said emitter, and said membrane being deflectable in response to liquid flow through said monitoring orifice into partially obstructing relation to a light beam directed from said light emitter to said light receiver in relation to the rate of liquid flow through said monitoring orifice; and
   a control for monitoring the rate of flow through said liquid passage and monitoring orifice in relation to the degree of deflection of said membrane into partially obstructing relation to said light beam emitted from said light emitter.

2. The spraying system of claim 1 in which said spray device is an electrically operated spray nozzle for cyclic opening and closing of the spray nozzle.

3. The spraying system of claim 1 in which said sensing device is part of a monitoring system operable for sensing a flow or no flow condition with respect to liquid passing through said monitoring orifice to said spray device.

4. The spraying system of claim 1 including at least one auxiliary liquid flow passage for communicating liquid from said inlet passage to said spray device outwardly of the membrane for enabling the direction of liquid from said supply passage to said spray device simultaneously with the direction of liquid through said monitoring orifice to said spray nozzle.

5. The spraying system of claim 4 including a plurality of said auxiliary passageways disposed radially outwardly of said membrane.

6. The spraying system of claim 1 in which said spray device has a discharge orifice from which a liquid spray discharges in an incident to liquid flow through the spray device, and said liquid flow monitoring device is disposed upstream of said discharge orifice.

7. The spraying system of claim 1 in which said light emitter and receiver each are contained within a protective photo eye holder.

8. The spraying system of claim 1 in which said liquid flow monitoring device includes an orifice member that defines said monitoring orifice, said membrane having a portion fixed to a downstream side of said orifice member and a deflectable portion that is deflectable into partially obstructing relation to a light beam directed from said light emitter to said light receiver as an incident the passage of liquid through the monitoring orifice.

9. The spraying system of claim 8 in which said membrane is centrally fixed to a downstream side of said orifice member and has a peripheral portion that is deflectable as an incident to passage of liquid through the monitoring orifice to the spray device.

10. The spraying system of claim 9 in which said orifice member includes a plurality of circumferentially spaced monitoring orifices through which liquid passes about a deflected peripheral portion of said membrane as an incident to the supply of liquid to said spray device.

11. A spraying system comprising:
a spray device for generating and directing a liquid spray;
a liquid supply passage for directing liquid to the spray device;
a liquid flow monitoring device for monitoring liquid flow through said spray device;
said liquid flow monitoring device including an orifice member in said liquid supply passage defining a monitoring orifice through which at least a portion of the liquid supplied to said spray device passes;
said membrane having a portion fixed to a downstream side of said orifice member and a deflectable portion that is deflectable into at least partially obstructing relation to a light beam directed from said light emitter to said light receiver as an incident to passage of liquid through the monitoring orifice;
a sensing device for sensing the deflection of the membrane away from said monitoring orifice as an incident to liquid flow through said liquid supply passage and monitoring orifice to said spray device;
said sensing device including a light sensing device having a light emitter on one side of said monitoring orifice for emitting a light beam and a light receiver on an opposite side of said monitoring orifice for receiving a light beam emitted by said emitter, said membrane being deflectable into at least partial obstructing relation to a light beam directed from said light emitter upon deflection of the membrane as an incident to the liquid flow through said monitoring orifice to said spray device; and
a control coupled to said sensing device for monitoring the flow of liquid through said liquid passage.

12. The spraying system of claim 11 in which said membrane is centrally fixed to a downstream side of said orifice member and has a peripheral portion that is deflectable as an incident to passage of liquid through the monitoring orifice to the spray device.

13. The spraying system of claim 12 in which said orifice member includes a plurality of circumferentially spaced monitoring orifices through which liquid passes about a deflected peripheral portion of said membrane as an incident to the supply of liquid to said spray device.

14. The spraying system of claim 11 including at least one auxiliary liquid flow passage for communicating liquid from said inlet passage to said spray device outwardly of the membrane for enabling the direction of liquid from said supply passage to said spray device simultaneously with the direction of liquid through said monitoring orifice to said spray nozzle.

* * * * *